US011194924B2

(12) United States Patent
Miller et al.

(10) Patent No.: US 11,194,924 B2
(45) Date of Patent: Dec. 7, 2021

(54) BLOCKCHAIN-BASED REQUEST FULFILLMENT

(71) Applicant: Accenture Global Solutions Limited, Dublin (IE)

(72) Inventors: Patricia A. Miller, Windermere, FL (US); Scott W. Perkins, St. Petersburg, FL (US); Shane R. Marshall, Valparaiso, IN (US); Peter Bidewell, London (GB); Rodrigo Yukio Ieto, London (GB)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 16/931,714

(22) Filed: Jul. 17, 2020

(65) Prior Publication Data

US 2020/0349274 A1 Nov. 5, 2020

Related U.S. Application Data

(63) Continuation of application No. 16/792,506, filed on Feb. 17, 2020, now Pat. No. 10,719,623.

(60) Provisional application No. 62/806,887, filed on Feb. 17, 2019.

(51) Int. Cl.
| | |
|---|---|
| *H04L 29/06* | (2006.01) |
| *H04L 9/00* | (2006.01) |
| *G06F 16/23* | (2019.01) |
| *G06F 21/62* | (2013.01) |
| *H04L 9/32* | (2006.01) |

(52) U.S. Cl.
CPC ........ *G06F 21/6227* (2013.01); *H04L 9/3236* (2013.01); *H04L 2209/38* (2013.01)

(58) Field of Classification Search
CPC G06F 21/6227; H04L 9/3236; H04L 2209/08
USPC ........................................................ 713/164
See application file for complete search history.

(56) References Cited

U.S. PATENT DOCUMENTS

| | | | | |
|---|---|---|---|---|
| 10,057,243 | B1 * | 8/2018 | Kumar | .................. H04L 9/0637 |
| 10,915,891 | B1 * | 2/2021 | Winklevoss | ........ G06Q 20/3678 |
| 2016/0012465 | A1 * | 1/2016 | Sharp | .................. G06Q 20/386 |
| | | | | 705/14.17 |
| 2018/0174122 | A1 | 6/2018 | Mattingly et al. | |
| 2019/0005507 | A1 * | 1/2019 | Rodoni | .................. G06Q 10/30 |
| 2019/0081794 | A1 * | 3/2019 | Vaziri | .................. H04L 9/3247 |
| 2019/0132350 | A1 * | 5/2019 | Smith | ................. G06F 16/2379 |

(Continued)

FOREIGN PATENT DOCUMENTS

| | | |
|---|---|---|
| AU | 2017100968 A4 | 7/2017 |
| CN | 108876572 A | 11/2018 |

OTHER PUBLICATIONS

Office Action issued in European patent application 20157526.3 dated Jun. 23, 2020, 10 pages.

*Primary Examiner* — Haresh N Patel
(74) *Attorney, Agent, or Firm* — Crowell & Moring LLP

(57) ABSTRACT

A system includes profile control circuitry that may receive a sovereign onboarding command. The sovereign onboarding command may be issued on behalf of a sovereign associated with a profile. The sovereign onboarding command may update a status value in the profile. The profile may be recorded on a data-tamper-protected distributed ledger. Arbitration circuitry may review the recorded profile status value and ensure that status values are enforced against the sovereign during exchanges.

14 Claims, 4 Drawing Sheets

(56) References Cited

U.S. PATENT DOCUMENTS

| | | |
|---|---|---|
| 2019/0163912 A1* | 5/2019 | Kumar .................. H04L 9/0643 |
| 2019/0349426 A1* | 11/2019 | Smith ................... H04L 67/104 |
| 2020/0092361 A1 | 3/2020 | Viswanathan et al. |
| 2020/0092364 A1 | 3/2020 | Schultz et al. |
| 2020/0011991 A1 | 4/2020 | Ojha et al. |
| 2020/0108840 A1 | 4/2020 | Andres et al. |
| 2020/0110813 A1 | 4/2020 | Kamijoh |
| 2020/0112432 A1 | 4/2020 | Iwama et al. |
| 2020/0112440 A1 | 4/2020 | Nakamura et al. |
| 2020/0112443 A1 | 4/2020 | Todd |
| 2020/0112446 A1 | 4/2020 | Yoshihama et al. |
| 2020/0117823 A1 | 4/2020 | Ojha et al. |
| 2020/0118131 A1 | 4/2020 | Diriye et al. |
| 2020/0118234 A1* | 4/2020 | Venkataraman ..... G06Q 50/265 |
| 2020/0119922 A1 | 4/2020 | Bingham et al. |
| 2020/0143337 A1* | 5/2020 | Conroy ............. G06Q 20/3829 |
| 2020/0167860 A1* | 5/2020 | Lau ....................... H04L 9/0637 |
| 2020/0202318 A1* | 6/2020 | Rab ....................... G06F 21/105 |
| 2020/0204557 A1* | 6/2020 | Singh .................. H04L 9/0637 |
| 2020/0211109 A1* | 7/2020 | Bean ...................... G06Q 40/02 |
| 2020/0213305 A1* | 7/2020 | Obaidi ................ H04L 63/0876 |
| 2020/0220730 A1* | 7/2020 | Hudson ..................... H04L 9/30 |
| 2020/0266994 A1* | 8/2020 | Drake .................. H04L 9/3239 |
| 2020/0275273 A1* | 8/2020 | Smith .................... H04W 12/35 |
| 2020/0349274 A1* | 11/2020 | Miller ................. G06F 21/6227 |
| 2021/0182996 A1* | 6/2021 | Cella .................. G06Q 10/0834 |

* cited by examiner

BLOCKCHAIN-BASED REQUEST FULFILLMENT

PRIORITY

This application is a continuation of and claims priority to U.S. patent application Ser. No. 16/792,506, filed 2 Feb. 2020, issuing as U.S. Pat. No. 10,719,623, and titled Cryptographic Datashare Control for Blockchain, which is incorporated herein in its entirety. U.S. patent application Ser. No. 16/792,506 claims priority to U.S. Provisional Patent Application No. 62/806,887, filed Feb. 17, 2019, and entitled Blockchain-Based Request Fulfillment, which is incorporated herein in its entirety.

TECHNICAL FIELD

This disclosure relates to blockchain-based request fulfillment.

BACKGROUND

Rapid advances in electronics and communication technologies, driven by immense customer demand, have resulted in the widespread adoption of electronic transactions, record keeping, and data sharing. As one example, e-currencies, such as Bitcoin, have displaced paper currencies in millions of transactions per year. Improvements in tracking and/or knowledge management attached to such electronic transactions will continue to increase the features and options available to operators engaging in electronic transactions.

DETAILED DESCRIPTION

Figure 1:
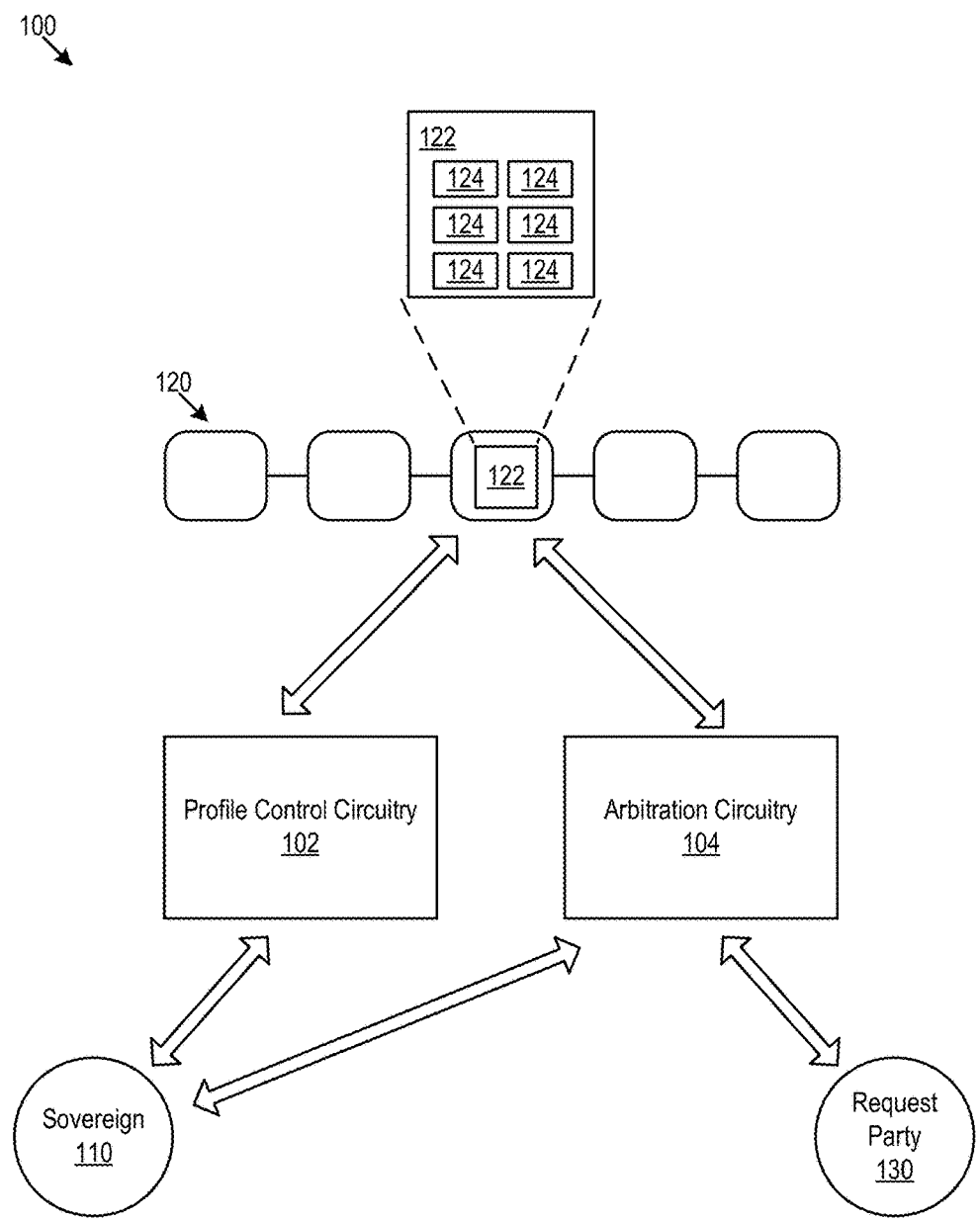
FIG. 1 shows an example sovereign control system that uses profile control circuitry and arbitration circuitry.

A distributed ledger may include a series or group of data blocks, the blocks including a code, such as a cryptographic hash or checksum, which may be coding-consistent with the content of previous blocks in the series. In some cases, determining multiple different sets of blocks that produce the same integrity code may be insoluble, prohibitively computationally complex, or otherwise effort intensive enough to frustrate attempts to tamper with the contents of the distributed ledger while maintaining the self-consistence of the integrity codes. Further, content within the distributed ledger may be encrypted to control access to selected information stored on the distributed ledger. A blockchain-based system is an illustrative example of a distributed ledger.

In various systems, commitments and/or other cryptographic primitives may be used to control visibility to data, for example, a commitment may be used to prove a fact about underlying data (e.g. the total number of fulfillment parties appraised of a request) without disclosing the underlying data itself (e.g., the identifications (IDs) associated with the individual fulfillment parties).

Cryptographic primitives, including commitments, hashes, and others, may be used to fashion zero-knowledge proofs (ZKPs) for the underlying data (e.g., which establish facts about the underlying data, but do not necessarily disclose it (e.g., the proof may operate with "zero knowledge" of the underlying data)). Accordingly, ZKPs may be used to control visibility (e.g., what data may be viewed/disclosed) to parties. For example, details about private status values (discussed below) may be disclosed without disclosing all data within the private status values. Additionally or alternatively, public key encryption may be used to control which parties may decrypt and view specific data. Signatures may be used to identify data sources and/or allow parties to endorse data from other sources as if their own.

In the context of fulfillment profile control, a sovereign (e.g., an identity with defined editing/control access may determine profile, credentials, access levels, fields, offerings, terms, conditions, or other profile content and settings via sovereign commands. Through the sovereign commands, the sovereign (and/or agents/nodes operating on behalf of the sovereign) is given control of the profile. The sovereign may also be given responsibility for the profile and the profile's contents. In some cases, a request party interacting (e.g., requesting fulfillment of a product or service request) with a sovereign may rely on content in the profile controlled by the sovereign. In some cases, a dispute may arise as to the timing of content changes and/or status at the time the interaction occurred. For example, the sovereign and request party may disagree as to the nature of representations made by the sovereign at the time of a request.

Sovereign control of accounts in conjunction with storage of the profile on distributed ledgers, which use cryptographic primitives, provides a technical solution to the technical problem of sequencing interactions in relation to profile content/setting status. The distributed ledger offers a medium in which both the sovereign and requesting party may independently verify the content at a particular point in time with technological assurance that the profile is immutable (or at least functionally immutable) without evidence of tamper. Accordingly, the sovereign may have trust, via this technological solution, that the sovereign will have the ability to prove what content was present at the time of the request. The request party may have similar trust, via the same technological solution, that sovereign can be held accountable for the content (even in the cases where human error (or other errors) leads to content that the sovereign did not properly account for prior to a dispute).

In various implementations, the request party may generate a request (e.g., within a request manifest that may be captured on the distributed ledger. The distributed ledger may be accessible by the request party and one or more sovereigns. The individual parties may control IDs. For example, the IDs may include public keys (or other cryptographic primitives), usernames, profiles, security credentials, or other identification. In accord with an access space (e.g., that designates the visibility of the request manifest), the sovereigns may view (e.g., at least a portion of) the request and determine whether or not to fulfill the request. For example, a sovereign may accept a request if the request is consistent with details on the sovereign's profile. In an example, a sovereign may reject a request if the request is inconsistent with details on the sovereign's profile. The shared nature of the blockchain data may ensure that both the request party and the fulfillment parties are viewing the same request with the same request conditions (e.g., the conditions that may be met to fulfill the request). Unification of storage may reduce data redundancy and increase efficiency. Accordingly, the techniques and architectures discussed herein may improve the operation of the underlying hardware and provide improvements over existing market solutions.

Figure 2:
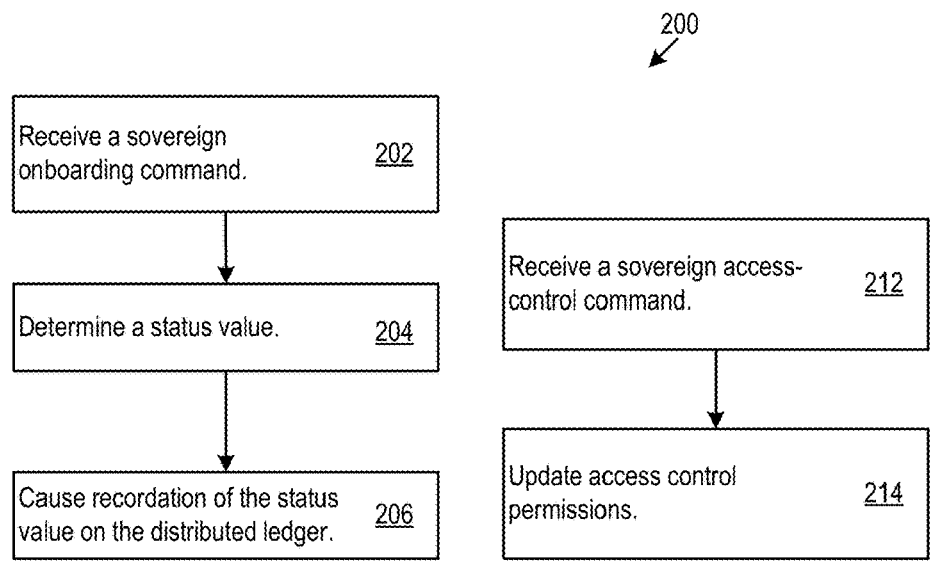
FIG. 2 shows profile control logic and arbitration logic.

An example sovereign control system 100 that uses profile control circuitry 102 and arbitration circuitry 104 is shown in FIG. 1. FIG. 2 shows profile control logic 200 and arbitration logic 250, which may serve as complementary execution logic for the profile control circuitry 102 and arbitration circuitry 104, respectively. In some implementations, profile operations (such as profile onboarding operations to read and/or edit profile content may be executed on (or implemented by) profile control circuitry 102.

In various implementations, the profile control circuitry 102 may receive a sovereign onboarding command (202), which may be sent (or issued) on behalf of a sovereign 110 associated with a profile 122 stored on a distributed ledger 120. The sovereign onboarding command may cause an addition, removal, or change to various status values for the profile 122. The status values may make up the content of the profile 122. Thus, control of these status values 124 may allow control of the content of the profile 122. The status values may vary in form. Further, in some cases, the sovereign may control which status values are to be included and/or the field structure defining what entries would be properly formatted value entries along with the actual values themselves.

In various implementations, sovereigns may establish a sovereign relationship with a profile by through the creation of a profile (e.g., directly creating the profile, having a creator assign sovereign status, or having a non-creator sovereign that previously received status sufficient to grant sovereign status to another identity.

In some cases, status may be passed through blockchain attestations. Accordingly, sovereign status may be conferred through stored assertions that a particular identity should have sovereign status for a particular profile. For example, sovereign status may be conferred through a profile-control reputational scheme where various DLT participants request that digitally signed tokens or other data elements be attributed to a particular identity. The identity with the most tokens or strongest reputation (weighted by the reputations of the attesters) may have the strongest rights to edit a profile. Additionally or alternatively, identities with a reputation above a pre-defined threshold may be granted sovereign rights. In this profile-control reputational scheme, unlike the general, exchange-confidence reputational scheme, reputational strength with respect to relationship with the specific profile is the focus. A strong general reputation for completing exchanges, under the exchange-confidence reputational scheme discussed below, may be insufficient to gain (e.g., profile-editing) rights for any particular profile.

Referring again to FIGS. 1 and 2, after receiving the sovereign onboarding command (202), the profile control circuitry 102 may determine a status value based on the sovereign onboarding command (204). For example, the profile control circuitry may add, edit, delete, or otherwise manage a status value.

After determination of the status value, the profile control circuitry may cause recordation of the status value on the distributed ledger 120 (206). Once recorded on the distributed ledger 120, the status value may have an established window of validity because the date/time which that status value was added to the distributed ledger 120 is verifiable. Further, the distributed ledger provides data-tamper protection. In other words, it can be established when a status value was added/changed and it can be established (and trusted by various parties) that the status value has not been altered since the time of addition/change.

In some cases, the status value may include a private status value. A private status value may be recorded on the distributed ledger in a cryptographic form where the recorded form of the private status value may (on its own) be insufficient to disclose the private status value. For example, a hash of the private status value may be recorded on the distributed ledger. The hash may prevent the sovereign that initiated the profile update from attempting to deceive others about the actual value of the private status value because if the underlying status value is changed after the hash is recorded the changed underlying status value will not match the hash. In an example, homomorphic encryption may be the cryptographic form used to generate private status values. In an example, cryptographic commitments may be the cryptographic form used to generate private status values.

For private status values, the profile circuitry 102 may perform access-control operations to control which DLT participants may view an underlying status value of a private status value.

In various implementations, an access control operation may include receiving a sovereign access control command sent on behalf of a sovereign associated with the profile (212). A sovereign access-control command can grant or revoke privileges for viewing/editing a profile. For example, an access control command may grant a particular participant or identity access to view of private status value. In some cases, the sovereign access-control command may set conditions for viewing private status values. For example, an identity attempting to a private status value may have to submit proof-of-compliance with viewing conditions. For example, the identity may have to submit a memory image, application execution listing, memory checksum, or other verification to show that particular software (that may prevent unauthorized copying or dissemination of the private status value) is in operation at the time of accessing the private status value. In some cases, the proof-of-compliance may be verified by DLT participants and exchange reputation merit may be added to the distributed ledger by the reviewing participant for a compliant identity/participant.

After the sovereign access-control command is received, the profile control circuitry may update access-control permissions for the identity referenced in the command (214). For example, the profile control circuitry may request an update to the distributed ledger to reflect the permission change. In an example, the profile control circuitry may execute the update, e.g., by providing or causing provision of a decrypted form of the private status value. The decrypted form being verifiable against the data-tamper-protected record containing the cryptographic form.

In some cases, exchanges based on the profiles stored on the distributed ledger may occur. The exchanges may include requests based on the profiles. For example, a request party 130 may issue a request based on information in a profile regarding service and/or product offerings. A sovereign or other agent may accept the request (e.g., if the request is complaint with the information in the profile and/or on other agreed-to terms that are recorded to the distributed ledger as part of the request and response thereto). A similar validity window may be applied to request terms once recorded to the distributed ledger. In some cases, the system may attribute sovereign like responsibility (e.g., liability) to the request party 130 for the content (and request conditions therein) of the request.

Accordingly, in some implementations, a sovereign is accountable for a profile while a request party is accountable for a request.

A request condition may refer to a condition (e.g., for example the provision of a service or product or a guarantee of such provision) that may be met to fulfill the request. The request specification may be a data field or other data form that specifies request conditions.

In some cases, a contention (similar to other technical contention situations, which may arise in wireless transmission and/or shared channel using in wireline transmission) may arise regarding validity windows for a status value within a profile and/or a request condition within a request. Referring again to FIGS. 1 and 2, the arbitration circuitry 104 may apply the arbitration logic 250 to the exchange to ensure status values and request conditions with validity windows covering the exchange are enforced.

The arbitration circuitry 104 may send a request (e.g., to a distributed ledger participant) to have a status value and/or request condition applied to an exchange (252). For example, the arbitration circuitry may request the exchange itself be added to the distributed ledger (including the status value and/or request condition). Additionally or alternatively, if the exchange has been previously requested or otherwise is already present on the distributed ledger, the arbitration circuitry may append an indicator pointing to the exchange on the distributed ledger. The indicator may include the status value and/or request conditions for which enforcement is sought. This may allow correction of erroneous or outdated exchange terms that may have been included in an original request for the exchange. The indicator may further include a reference to the status values and/or request conditions that are relevant. Accordingly, reviewing parties may be able to independently determine the validity windows for the status values and request conditions and determine if the status values and request conditions should be properly applied to the exchange.

After the arbitration circuitry 104 sends the request to have the status value and/or request condition applied to an exchange, the arbitration circuitry may review the exchange record (including any later appended references) on the distributed ledger and ensure that the status value and/or request condition has been applied (254). In some cases, the arbitration circuitry take an enforcement action in response to a review (256). For example, the arbitration circuitry may request that reputational merits be recorded to the distributed ledger for the sovereign and/or request party when the proper status values and/or request conditions are applied without need of warnings or reminders from the arbitration circuitry. Additionally or alternatively, when improper status values and/or request conditions are applied, the arbitration circuitry may issue a warning to the sovereign and/or request party. This warning may provide the sovereign and/or request party with an opportunity to correct the terms of the exchange or demonstrate that the currently applied terms are correct (e.g., by referencing a portion of the distributed ledger showing the validity of the currently applied terms, showing an off-ledger agreement between the sovereign and request parties, or other evidence). In some cases, the arbitration circuitry may issue reputational demerits for non-compliant sovereigns and/or request parties, extract penalties (e.g., such as monetary or cryptocurrency penalties), and/or proceed as if the valid terms have been applied (even under protest by one or more of the identities involved in the exchange (e.g., exchange parties).

The exchange-confidence reputational scheme may operate on the distributed ledger. Reviewing ledger participants may review records of exchanges to determine if the proper status values and/or request terms where applied by the exchanging parties. When an identity (such as a sovereign) is found to not have upheld valid status values when performing an exchange, the reviewing ledger participant may issue a demerit. A demerit may include data recorded to the distributed ledger indicating that a particular identity pose some risk that they will not uphold proposed terms in future exchanges. Similarly, in some implementations, merits may be issued when reviewing ledger participants find that exchange terms have been upheld. Merits may similarly include data recorded to the distributed ledger indicating that terms have been upheld by a particular identity.

Further, the exchange-confidence reputational scheme may be used as an attestation scheme where parties to an exchange may review their counterpart's performance. For example, when a request party is pleased with the performance of a sovereign, the request party may attest that the sovereign is a good operator by requesting that merits be recorded to the profile of the sovereign. In some implementations, the request party may similarly request demerits be recorded where the request party is displeased with the performance of the sovereign.

In some cases, such merits/demerits are proposed the general participants of the distributed ledger who may vote (e.g., in a DLT consensus procedure) to determine when such merits/demerits are added to the distributed ledger.

Figure 3:
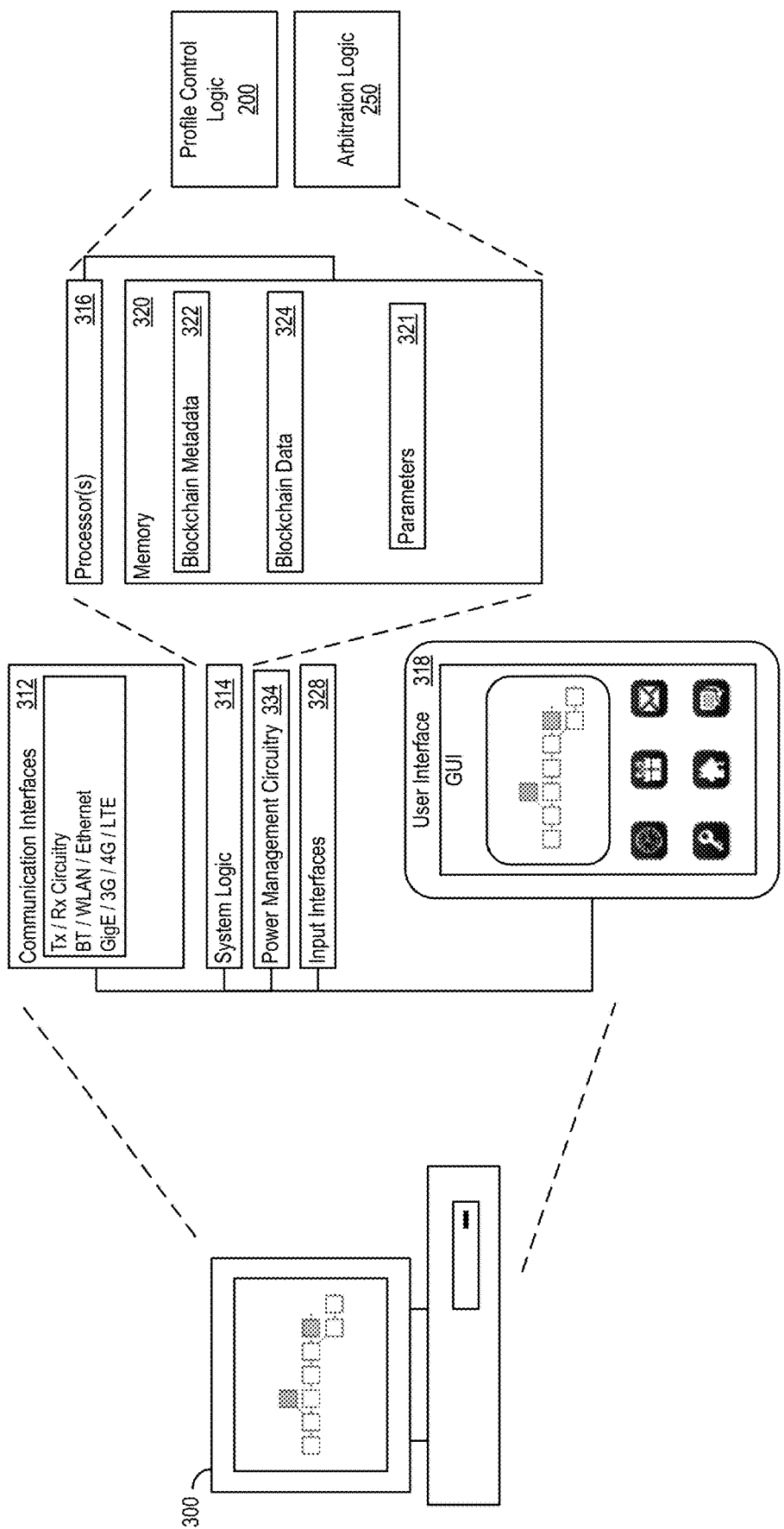
FIG. 3 shows an example exchange control system.

FIG. 3 shows an example exchange control system (ECS) 300, which may provide an execution environment for implementing the profile control logic 200 and/or the arbitration logic 250. The ECS 300 may be used by, for example, a sovereign requesting an update to a profile stored on a distributed ledger. The ECS 300 may include system logic 314 to support homomorphic encryption and decryption; generation of encryption parameters; manipulation of encrypted data (e.g., processing to glean insights); designating access controls; generating IDs; onboarding data collection; distributed ledger entry generation and/or other actions. The system logic 314 may include processors 316, memory 320, and/or other circuitry, which may be used to implement profile control logic 200 and/or the arbitration logic 250, which may implement profile control operations and/or arbitration operations.

The memory 320 may be used to store distributed ledger metadata 322 and/or distributed ledger data 324 used in profile control operations and/or arbitration operations. The memory 320 may further store encryption parameters 321, such as an encryption key value, homomorphic parameters, such as, in an example homomorphic encryption scheme, axes values for an elliptic curve, or other secret value, that may facilitate private status value access enforcement, distributed ledger entry, or other operations using cryptographically primitives.

The memory 320 may further include applications and structures, for example, coded objects, templates, or one or more other data structures to support profile control operations and/or arbitration operations. The ECS 300 may also include one or more communication interfaces 312, which may support wireless, e.g. Bluetooth, Wi-Fi, WLAN, cellular (3G, 4G, LTE/A), and/or wired, ethernet, Gigabit ethernet, optical networking protocols. The communication interface 312 may support communication, e.g., through the communication layer, with other parties to facilitate profile control operations and/or arbitration operations. Additionally or alternatively, the communication interface 312 may support secure information exchanges, such as secure socket layer (SSL) or public-key encryption-based protocols for sending and receiving private data. The ECS 300 may include power management circuitry 334 and one or more input interfaces 328.

The ECS 300 may also include a user interface 318 that may include man-machine interfaces and/or graphical user interfaces (GUI). The GUI may be used to present interfaces and or profile control operation options and/or arbitration operation options to operators working on behalf of the various identities described above.

Example Implementations

The example implementations included below are described to be illustrative of various ones of the principles discussed above. However, the examples discussed below are not intended to be limiting, but rather, in some cases, specific examples to aid in the illustration of the above described techniques and architectures. In various ones of the examples, the request party may correspond to a "buyer" and the sovereign may correspond to a "supplier" and/or "vendor." Various features of the example implementations below may be present in other implementations and absent in yet other implementations. The features of the following example implementations may be combined in various groupings in accord with the techniques and architectures described above.

Hyperledger Fabric Logical Architecture

Presentation Layer

A user interface may interact with the application layer and provide a way to users to perform actions.

Application Layer

For an example web app server, the RedHat Operating System (OS) may be used to run the application controller using Node JavaScript (JS). Smart contracts may be executed through the Hyperledger Fabric Network using Node JS Software Development Kit (SDK). The example Hyperledger Fabric runs in a modular and extendable architecture it will run in a container environment (docker images) in RedHat OS VM provisioned on Amazon Web Services (AWS).

Database Layer

In the Database Layer, each peer in the Hyperledger Fabric may have their own CouchDB this will save any transactions for tracking within the network. Supplier data that is protected may be encrypted and saved in an off-chain database using AWS S3 Buckets.

Hyperledger Fabric Network Services

A Hyperledger Fabric is a permissioned blockchain and participants in the network can be operated under a governance model. The Hyperledger Fabric is a modular architecture with pluggable consensus, pluggable key management and modular components in a container environment.

A pluggable ordering service establishes consensus at the per transaction or per few transactions level and then broadcasts blocks to peers via a gossip protocol. A membership service provider is responsible for associating entities in the network with cryptographic identities.

An optional peer-to-peer gossip service disseminates the blocks output by ordering service to other peers.

Smart contracts run within a container environment for isolation. They can be written in standard programming languages but do not necessarily have direct access to the ledger state.

The ledger can be configured to support a variety of database management systems (DBMS). A pluggable endorsement and validation policy enforcement that can be independently configured per application.

The connection from frontend to the Hyperledger Fabric may be performed by gRPC Remote Procedure Call (gRPC—recursive acronym) and we will utilize Node JS SDKs for secured communication.

To join the network, a controller may connect with our Fabric Certificate Authority and check the root-authority-signed certificate. The certificate certifies the participant's identity on communicating on the networks. Siteminder servers may be used to manage sign-ons. In some cases, Siteminder agents may be used with Websphere and Weblogic.

Development Environment

Figure 4:
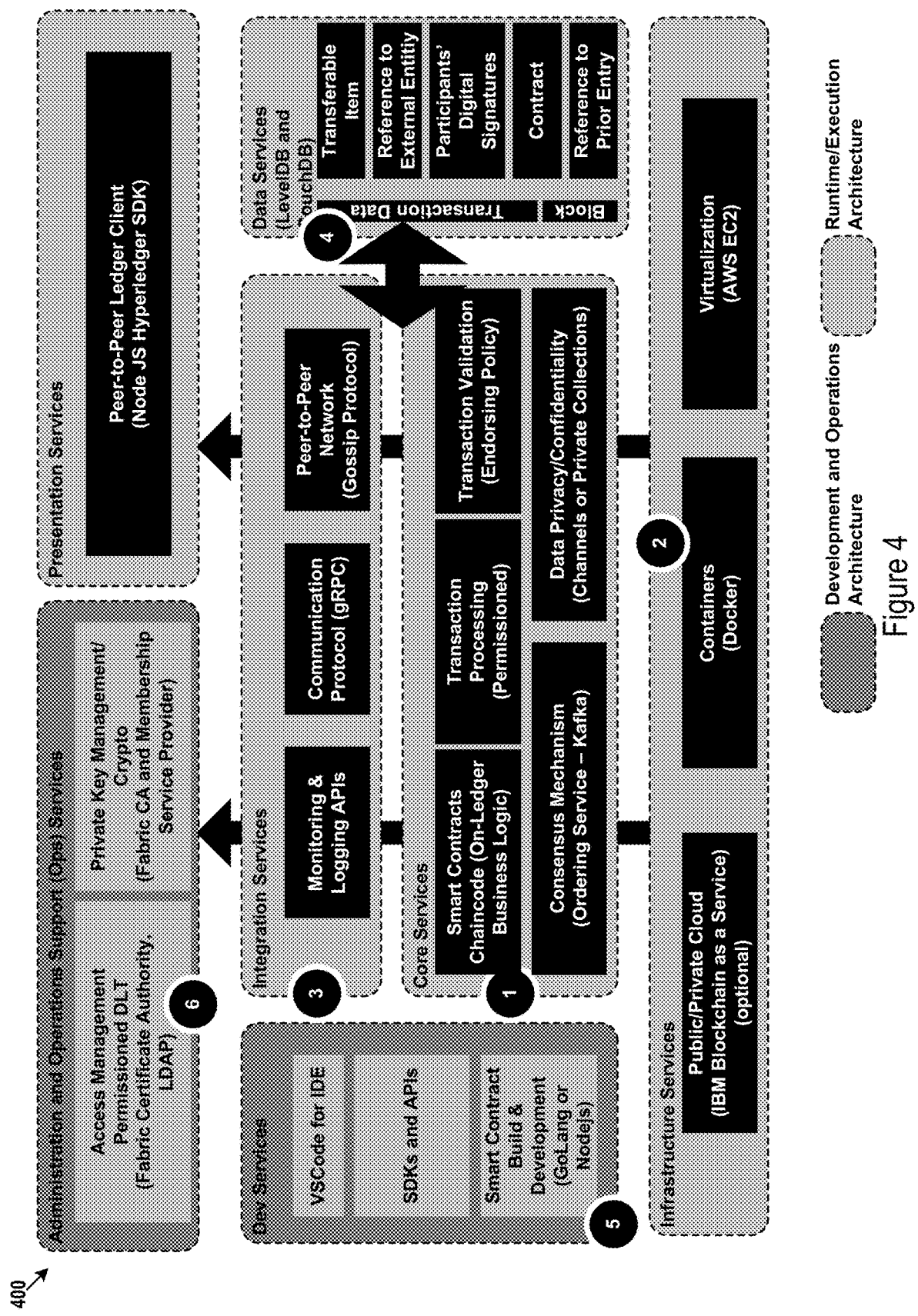
FIG. 4 shows an example implemented operation environment.

FIG. 4 shows an example implemented operation environment 400 for a Hyperledger-Fabric-based example sovereign profile control system.

Hyperledger Fabric Nodes

In an example simulation, two nodes were provision as Virtual Machines on AWS EC2 with RedHat OS: One node having registration and buyer organizations. One node having supplier organizations. In the simulation, the nodes interacted to provide service.

WebApp Server

The webapp virtual machine hosted the Node JS SDK and application controller for registration, buyer and supplier for the simulation.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be embodied as a signal and/or data stream and/or may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may particularly include a storage medium and instructions stored in or on the medium, and the instructions when executed by the circuitry in a device may cause the device to implement any of the processing described above or illustrated in the drawings.

The implementations may be distributed as circuitry, e.g., hardware, and/or a combination of hardware and software among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations may use the techniques and architectures described above.

A1 In an example, a system includes profile control circuitry configured to: execute a profile onboarding operation by: receiving a sovereign onboarding command sent on behalf of a sovereign associated with a profile; based on the sovereign onboarding command, determining a private status value for a profile entry; and causing recordation of the private status value within a data-tamper-protected record stored in a cryptographic form on a distributed ledger for the profile entry to establish a validity window for the private status value, the data-tamper-protected record in the cryptographic form being accessible by clients with access to the distributed ledger, and the cryptographic form of the data-tamper-protected record alone being insufficient to disclose the private status value; execute a profile access-control operation by: receiving a sovereign access-control command sent on behalf of the sovereign, the sovereign access-control command to provide viewing access for the private status value; and responsive to the sovereign access-control command, granting decrypted access, for a target identity, to the private status value, the private status value, viewable via the decrypted access, being verifiable against the data-tamper-protected record while in the cryptographic form; and arbitration circuitry configured to execute a status arbitration operation by: sending a request that the private status value be applied for an exchange, the request including the private status value and referencing the data-tamper-protected record; and when the exchange occurs within the validity window and responsive to the request, reviewing an exchange record on the distributed ledger indicating that the exchange was executed with the private status value applied.

A2 The system of example A1, where a decrypted form of the private status value is maintained on behalf of the sovereign in storage outside of the distributed ledger.

A3 The system of either of examples A1 or A2, where the profile control circuitry is configured to provide viewing access for the private status value by providing access to the storage outside of the distributed ledger.

A4 The system of any of examples A1-A3, where the cryptographic form includes a hash, where comparison between the hash and an altered version the private status value is configured to indicate tamper.

A5 The system of any of examples A1-A4, where the arbitration circuitry is further configured to execute an enforcement action when an exchange is found to not comply with a relevant status value with a validity window covering the time of the exchange.

A6 The system of any of examples A1-A5, where the enforcement action includes issuing a warning to the sovereign that the exchange is non-compliant.

A7 The system of any of examples A1-A6, where the arbitration circuitry is configured to receive a reference to a portion of the distributed ledger indicating that the validity window does not cover the time of the exchange.

A8 The system of any of examples A1-A7, where the enforcement action includes a request that a demerit be recorded against the sovereign on the distributed ledger, the demerit compliant with an exchange-confidence reputational scheme.

A9 The system of any of examples A1-A8, where the request that the demerit be recorded is subject to a distributed ledger consensus vote before the demerit is recorded.

A10 The system of any of examples A1-A9, where the profile control circuitry is further configured to request recordation of the viewing access grant on the distributed ledger.

B1 In an example, a method includes: at profile control circuitry: executing a profile onboarding operation by: receiving a sovereign onboarding command sent on behalf of a sovereign associated with a profile; based on the sovereign onboarding command, determining a private status value for a profile entry; and causing recordation of the private status value within a data-tamper-protected record stored in a cryptographic form on a distributed ledger for the profile entry to establish a validity window for the private status value, the data-tamper-protected record in the cryptographic form being accessible by clients with access to the distributed ledger, and the cryptographic form of the data-tamper-protected record alone being insufficient to disclose the private status value; executing a profile access-control operation by: receiving a sovereign access-control command sent on behalf of the sovereign, the sovereign access-control command to provide viewing access for the private status value; and responsive to the sovereign access-control command, granting decrypted access, for a target identity, to the private status value, the private status value, viewable via the decrypted access, being verifiable against the data-tamper-protected record while in the cryptographic form; and at arbitration circuitry: executing a status arbitration operation by: sending a request that the private status value be applied for an exchange, the request including the private status value and referencing the data-tamper-protected record; and when the exchange occurs within the validity window and responsive to the request, reviewing an exchange record on the distributed ledger indicating that the exchange was executed with the private status value applied.

B2 The method of example B1, where a decrypted form of the private status value is maintained on behalf of the sovereign in storage outside of the distributed ledger.

B3 The method of either of examples B1 or B2, further including providing viewing access for the private status value by providing access to the storage outside of the distributed ledger.

B4 The method of any of examples B1-B3, where the cryptographic form includes a hash, where comparison between the hash and an altered version the private status value is configured to indicate tamper.

B5 The method of any of examples B1-B4, further including requesting recordation of the viewing access grant on the distributed ledger.

C1 In an example, a product includes: a machine-readable medium other than a transitory signal; and instructions stored on the machine-readable medium, the instructions, when executed, configured to cause a machine to: at profile control circuitry: execute a profile onboarding operation by: receiving a sovereign onboarding command sent on behalf of a sovereign associated with a profile; based on the sovereign onboarding command, determining a private status value for a profile entry; and causing recordation of the private status value within a data-tamper-protected record stored in a cryptographic form on a distributed ledger for the profile entry to establish a validity window for the private status value, the data-tamper-protected record in the cryptographic form being accessible by clients with access to the distributed ledger, and the cryptographic form of the data-tamper-protected record alone being insufficient to disclose the private status value; execute a profile access-control operation by: receiving a sovereign access-control command sent on behalf of the sovereign, the sovereign access-control command to provide viewing access for the private status value; and responsive to the sovereign access-control command, granting decrypted access, for a target identity, to the private status value, the private status value, viewable via the decrypted access, being verifiable against the data-tamper-protected record while in the cryptographic form; and at arbitration circuitry: execute a status arbitration operation by: sending a request that the private status value be applied for an exchange, the request including the private status value and referencing the data-tamper-protected record; and when the exchange occurs within the validity window and responsive to the request, reviewing an exchange record on the distributed ledger indicating that the exchange was executed with the private status value applied.

C2 The product of example C1, where the instructions are further configured to cause the machine to execute an enforcement action when an exchange is found to not comply with a relevant status value with a validity window covering the time of the exchange.

C3 The product of either of examples C1 or C2, where the enforcement action includes issuing a warning to the sovereign that the exchange is non-compliant.

C4 The product of any of examples C1-C3, where the instructions are further configured to cause the machine to receive a reference to a portion of the distributed ledger indicating that the validity window does not cover the time of the exchange.

C5 The product of any of examples C1-C4, where the enforcement action includes a request that a demerit be recorded against the sovereign on the distributed ledger, the demerit compliant with an exchange-confidence reputational scheme.

D1 A method implemented by operation of a system of any of examples A1-A10.

E1 A product including instructions stored on a machine-readable medium, the instructions configured to cause a machine to implement the method of example D1.

Various implementations have been specifically described. However, many other implementations are also possible.

What is claimed is:

1. A system comprising
memory configured to store a blockchain; and
fulfillment circuitry configured to execute a fulfillment stack including:
  a chain layer;
  a request layer; and
  a fulfillment layer;
the fulfillment circuitry configured to:
  receive, at the request layer, a request manifest linked to a requestor identification (ID) controlled by a request party, the request manifest including:
    a request specification that defines a request condition for fulfillment; and
    a space description defining an access space for one or more fulfillment IDs controlled by corresponding fulfillment parties;
  at the chain layer, request a request entry for storage in the blockchain, the request entry capturing content of the request manifest when the request manifest is encrypted to facilitate enforcement of the access space;
  based on the request entry and at the fulfillment layer, receive a fulfillment manifest linked to a selected fulfillment ID of the one or more fulfillment IDs, the fulfillment manifest configured to acknowledge the request condition; and
  at the chain layer, request a fulfillment entry for storage in the blockchain, the fulfillment entry capturing content of the fulfillment manifest when the fulfillment manifest is encrypted to facilitate enforcement of the access space.

2. The system of claim 1, where:
the fulfillment stack further includes a communication layer, the communication layer configured to generate a selected notification addressed to the selected ID.

3. The system of claim 2, where the communication layer is configured to generate the selected notification in response to storage of the request entry within the blockchain.

4. The system of claim 1, where the request entry includes:
  a hash of the request manifest while encrypted to facilitate enforcement of the access space;
  a hash tree root generated based on a hash of the request manifest while encrypted to facilitate enforcement of the access space;
  content of the request manifest while encrypted to facilitate enforcement of the access space; or
  any combination thereof.

5. The system of claim 1, where the fulfillment manifest further includes a fulfillment condition.

6. The system of claim 1, where the fulfillment circuitry if further configured to receive, at the request layer, an update manifest, the update manifest configured to:
  alter the request condition;
  add an additional request condition;
  remove the request condition;
  alter access for a specific fulfillment ID of the one or more fulfillment IDs;
  add a designated fulfillment ID to the one or more fulfillment IDs;
  remove the specific fulfillment ID of the one or more fulfillment IDs; or
  any combination thereof.

7. The system of claim 1, where the space description designates whether each of the one or more corresponding fulfillment parties controlling the one or more fulfillment IDs may decrypt and view the request condition within the request manifest.

8. The system of claim 1, where the space description designates whether each of the one or more corresponding fulfillment parties controlling the one or more fulfillment IDs may decrypt and view the space description sufficient to determine a number of the one or more fulfillment IDs.

9. The system of claim 1, where the space description designates whether each of the one or more corresponding fulfillment parties controlling the one or more fulfillment IDs may decrypt and view the space description sufficient to determine other ones of the one or more fulfillment IDs.

10. The system of claim 1, where the fulfillment stack includes an onboarding layer.

11. The system of claim 10, where the fulfillment circuitry is configured to generate, at the onboarding layer, the one or more fulfillment IDs.

12. The system of claim 10, where the fulfillment circuitry is configured to:

at the onboarding layer:
  generate an interface to collect onboarding data on a target fulfillment party of the corresponding fulfillment parties;
  receive the onboarding data responsive to the interface; and
  associate the onboarding data with a target fulfillment ID controlled by the target fulfillment party.

13. The system of claim 12, where the fulfillment circuitry is configured to, at the chain layer, request an onboarding entry for storage in the blockchain, the onboarding entry configured to capture the onboarding data.

14. The system of claim 12, where:
the fulfillment stack further includes a communication layer; and
the fulfillment circuitry is configured to, at the communication layer, provide the interface to the request party, the target fulfillment party, or both.

* * * * *